June 5, 1928. 1,672,212
W. HALE
MOTOR VEHICLE
Filed May 15, 1926 4 Sheets-Sheet 2
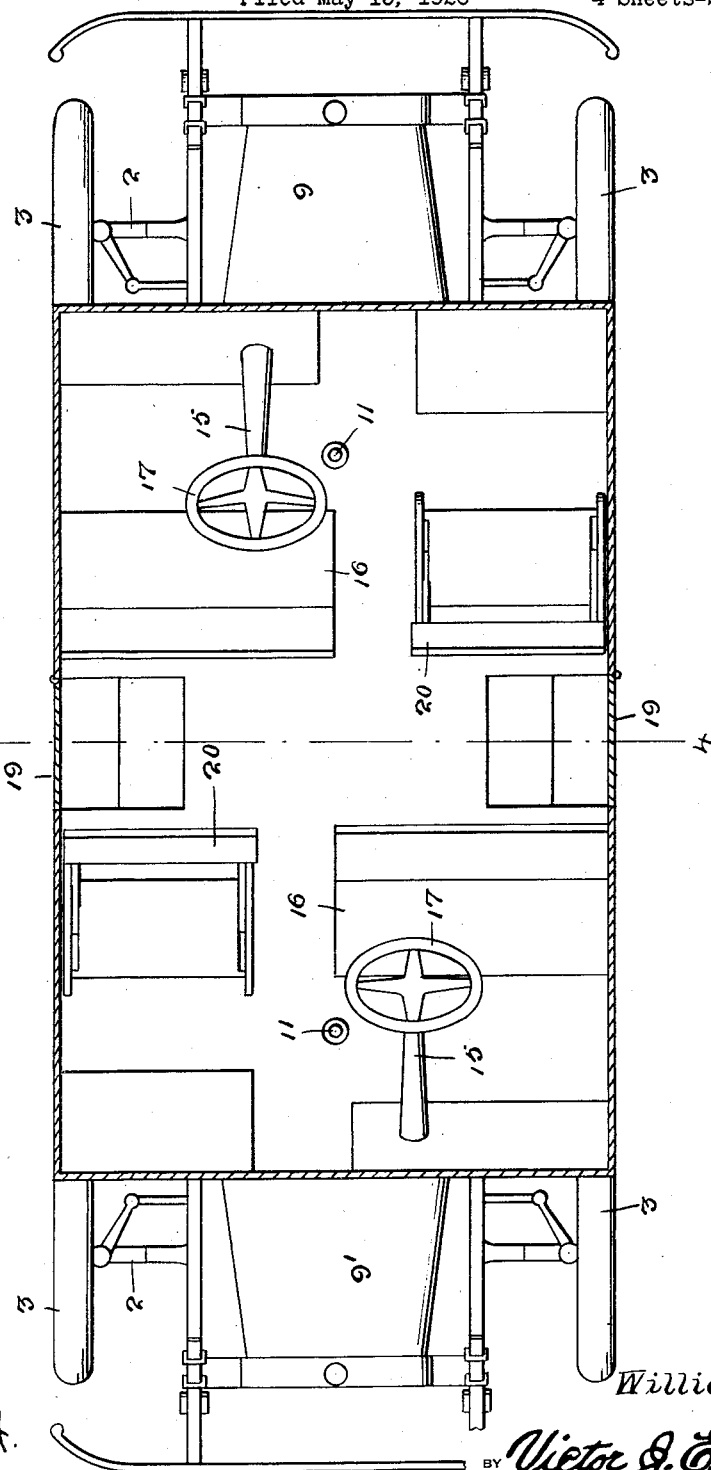
William Hale
INVENTOR
BY Victor J. Evans
ATTORNEY
WITNESS:

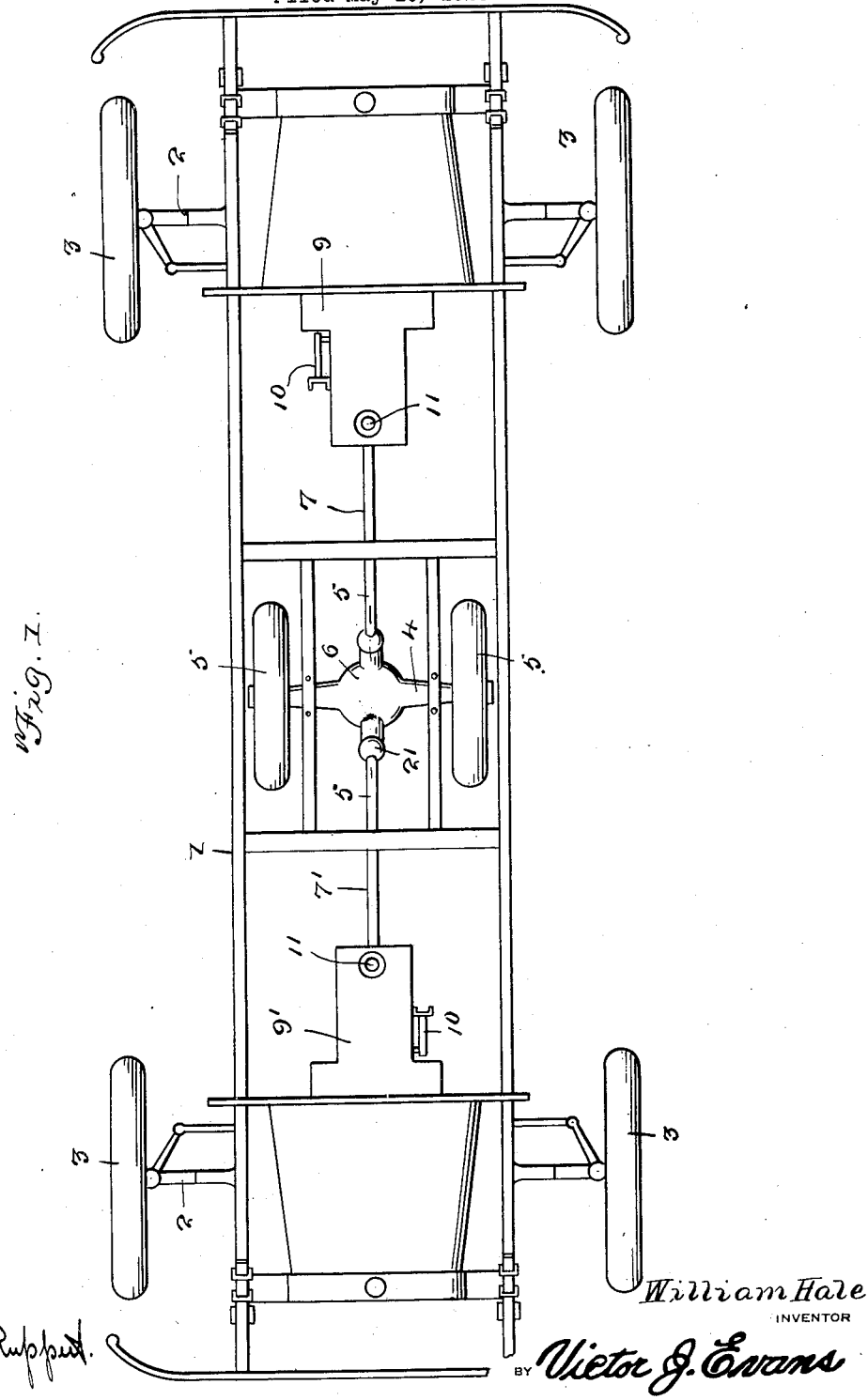

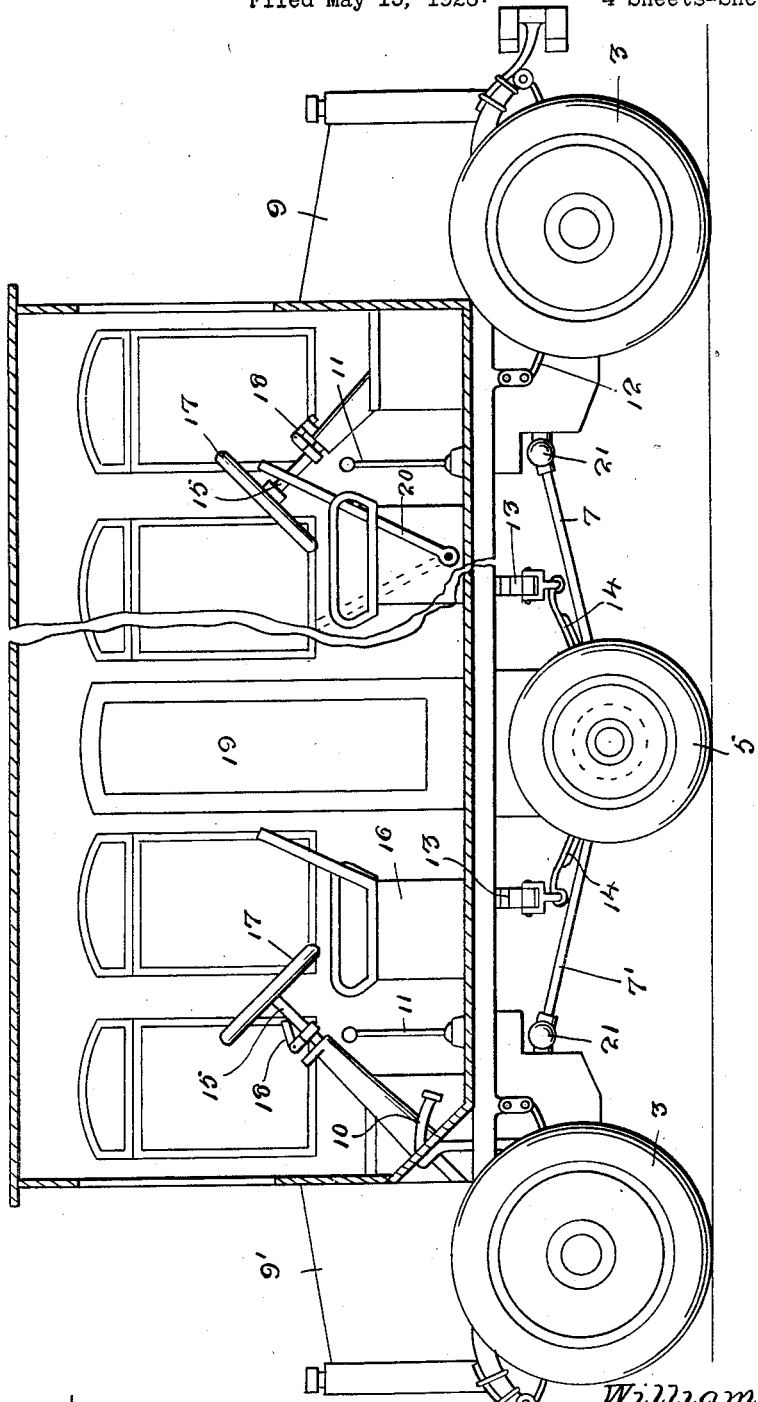

June 5, 1928.
W. HALE
MOTOR VEHICLE
Filed May 15, 1926     4 Sheets-Sheet 4
1,672,212
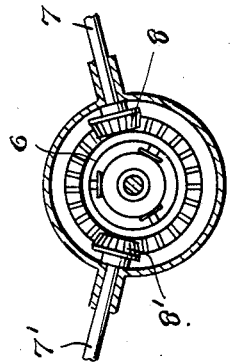
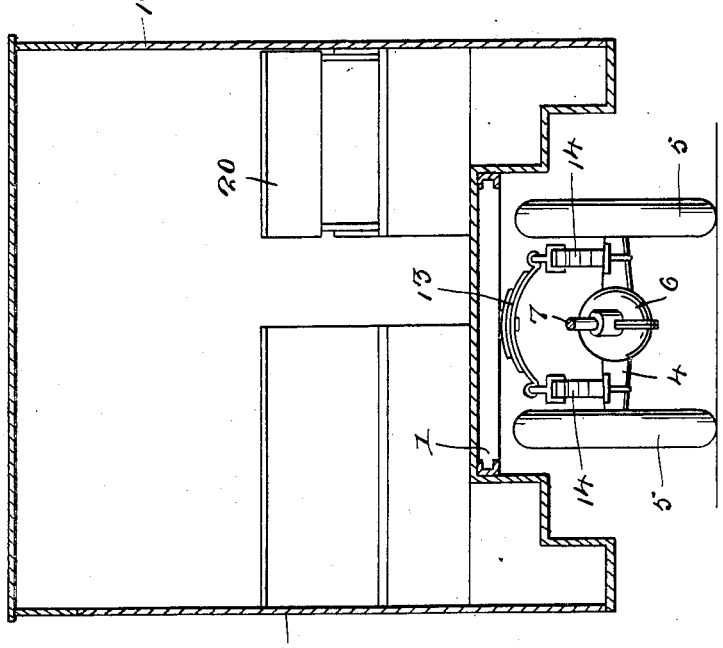
William Hale
INVENTOR
BY Victor J. Evans
ATTORNEY
WITNESS: E. R. Ruppert.

Patented June 5, 1928.

1,672,212

UNITED STATES PATENT OFFICE.

WILLIAM HALE, OF LITWAR, WEST VIRGINIA.

MOTOR VEHICLE.

Application filed May 15, 1926. Serial No. 109,338.

This invention relates to improvements in motor vehicles, the general object of the invention being to provide a vehicle with means whereby it can be driven from either end so that it is not necessary to turn the vehicle around when it is to make the return trip over a rough road, the invention being especially applicable to motor busses, trucks and the like.

Another object of the invention is to provide a pair of centrally arranged drive wheels with means for driving them from either motor of a pair of motors which are arranged at the ends of the vehicle.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the chassis of a vehicle constructed in accordance with this invention.

Figure 2 is a plan view with parts in section.

Figure 3 is a side view with parts in section.

Figure 4 is a section on line 4—4 of Figure 2.

Figure 5 is a section through line 5—5 of Figure 1.

As shown in these views, the chassis 1 of the vehicle is supported adjacent its ends by the axles 2, to which the wheels 3 are pivotally connected so that they can be shifted in the usual manner to steer the vehicle, and by a centrally located axle assembly 4, which carries the wheels 5. The axle assembly 4 is of less length than the width of the chassis so that the wheels 5 are located under the chassis and this assembly includes the differential 6 which is engaged by the two shafts 7 and 7' through the pinions 8 and 8'. A power plant is arranged at each end of the vehicle, as shown at 9 and 9' for driving the shafts 7 and 7', the clutch means of each plant being controlled by the usual pedal 10 and gear shift 11. The axles 2 are connected with the vehicle by the usual springs 12 and a pair of springs 13 are connected with the chassis, one on each side of the center thereof and these springs are connected with the ends of another pair of springs 14 which are connected at their centers with the axle assembly 4. The usual steering shaft 15 is connected with the steering mechanism of each pair of wheels 3 so that the vehicle can be steered and operated from each end thereof, a seat 16 being arranged adjacent each steering wheel 17. A lock 18 is provided for locking each steering mechanism with the wheels in a neutral or straight position so that when the vehicle is being driven from one end the steering mechanism at the other end is locked against movement. The body is provided with a pair of centrally arranged doors 19 and the backs 20 of all the seats are hinged so that the backs can be reversed, as is customary in steam cars, so that the passengers can always face in the direction of travel of the vehicle. The drive shafts 7 and 7' are provided with the usual universal joints 21.

From the foregoing it will be seen that I have provided a vehicle with means whereby it can be driven from either end so that it is not necessary to turn the vehicle. Turning of large vehicles, such as busses and trucks is a problem and this is eliminated by this invention. It will be understood that when the vehicle is being driven from one end the mechanism at the other end is inactive with the steering mechanism locked in neutral position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A motor vehicle of the class described comprising a chassis, an axle at each end thereof, a pair of wheels pivoted to each axle, steering mechanism at each end connected with the wheels, means for locking the steering mechanism at each end of the vehicle in neutral position, a power plant at each end of the vehicle, an axle assembly, said assembly including a differential and jack shafts connecting the differential with the power plants.

In testimony whereof I affix my signature.

WILLIAM HALE.